United States Patent [19]

Hergenröther

[11] Patent Number: 5,362,182
[45] Date of Patent: Nov. 8, 1994

[54] WASTE DISPOSAL LANDFILL HAVING SUBSURFACE IMPERMEABLE SHEETS WHICH CAN BE MONITORED WITH RESPECT TO THEIR IMPERMEABILITY

[75] Inventor: Hans-Günter Hergenröther, Nidda, Germany

[73] Assignee: Frank Deponietechnik GmbH, Hungen, Germany

[21] Appl. No.: 920,870

[22] Filed: Jul. 28, 1992

[30] Foreign Application Priority Data

Aug. 1, 1991 [DE] Germany ............... 4125430

[51] Int. Cl.$^5$ ............... B09B 1/00
[52] U.S. Cl. ............... 405/129; 405/38; 405/270; 588/260
[58] Field of Search ............... 324/522, 559; 405/36, 405/38, 129, 270, 274; 588/255, 260

[56] References Cited

U.S. PATENT DOCUMENTS

| | | | |
|---|---|---|---|
| 3,252,155 | 5/1966 | Surtees et al. | 324/522 |
| 4,543,525 | 9/1985 | Boryta et al. | 324/559 |
| 4,725,785 | 2/1988 | Converse et al. | 324/559 |
| 4,947,470 | 8/1990 | Darilek | 324/557 |
| 5,076,728 | 12/1991 | Golding | 405/128 |

FOREIGN PATENT DOCUMENTS

| | | |
|---|---|---|
| 0307615 | 3/1989 | European Pat. Off. . |
| 0408938 | 1/1991 | European Pat. Off. . |
| 0418209 | 3/1991 | European Pat. Off. . |
| 2362051 | 3/1978 | France . |
| 3322772 | 1/1985 | Germany . |
| 3544264 | 6/1987 | Germany . |
| 8902073 | 8/1989 | Germany . |
| 3924057 | 7/1990 | Germany . |
| 88069299 | 9/1988 | WIPO . |

*Primary Examiner*—Marianne M. Cintins
*Assistant Examiner*—K. Weddington
*Attorney, Agent, or Firm*—Nils H. Ljungman & Associates

[57] ABSTRACT

A waste disposal landfill has at least one subsurface impermeable sheet for containing and directing fluid runoff from the site. This impermeable sheet can be remotely monitored with respect to its impermeability to verify that there are no breaks in the sheet and that no waste is passing therethrough.

20 Claims, 2 Drawing Sheets

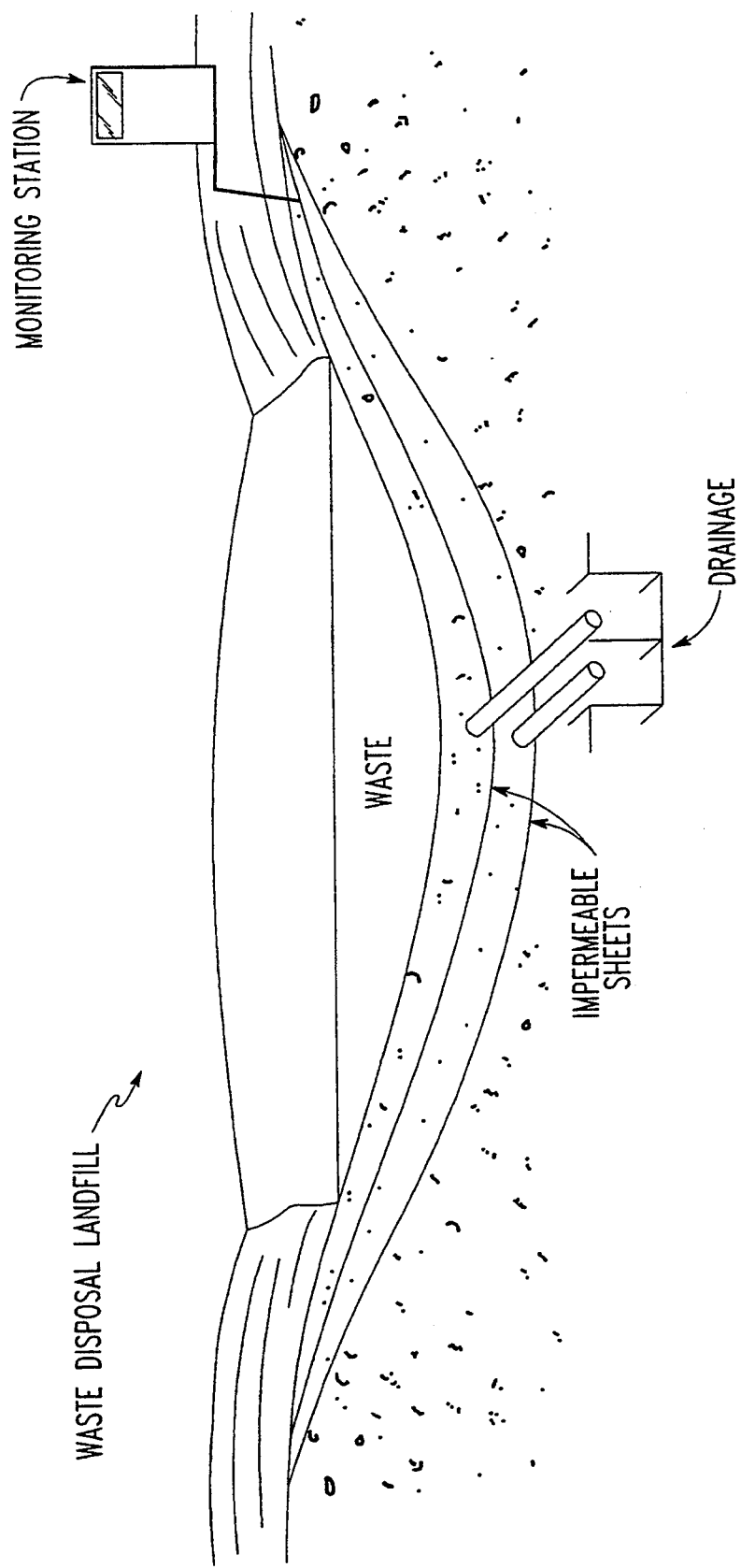

WASTE DISPOSAL LANDFILL HAVING SUBSURFACE IMPERMEABLE SHEETS WHICH CAN BE MONITORED WITH RESPECT TO THEIR IMPERMEABILITY

BACKGROUND OF THE INVENTION

1. Field of the Invention

The invention relates to a waste disposal landfill having at least one subsurface impermeable sheet to contain and direct fluid runoff from the site, which impermeable sheet can be remotely monitored with respect to its impermeability to verify that no waste is passing therethrough. More particularly, the invention relates to an impermeable sheet, such as those used in a waste disposal landfill, the impermeability of which sheet can be remotely monitored to verify the integrity of the sheet.

2. Background Information

In order to keep pollutants from seeping into deeper layers of the ground under a waste disposal landfill, a multilayer structure of impermeable sheets of plastic are typically used. Each of these layers can drain into separate drainage tubes, and the drainage tubes themselves can drain into inspection pits. Thus, one method of monitoring the integrity of the sheets is to analyze the drainage in the inspection pits for pollutants. Such a design of waste disposal landfill including means for monitoring the drainage, however, is expensive and thus not always feasible. In addition, the content of the seepage water discharged from the tubes into the inspection pits cannot be easily monitored at a remote site, and generally must be inspected on site at least by collecting a runoff sample and taking it to be analyzed by an analysis laboratory.

OBJECT OF THE INVENTION

The object of the present invention is therefore to overcome the monitoring problems of landfill sites by providing a double layer impermeable plastic sheet which is easy to manufacture and which offers a means of monitoring the impermeability of the two plastic sheets, which monitoring is both effective and can be performed automatically at a remote site.

SUMMARY OF THE INVENTION

This task is solved according to the present invention by providing waste disposal landfills with an arrangement of impermeable sheets, preferably of a plastic material, which sheets preferably have embedded therebetween a monitoring layer made of an electrically conductive substance. One embodiment of the sheets therefore can comprise a double layer impermeable plastic sheet having an electrically conductive plastic layer therebetween. With such an arrangement, the electric conductivity of the monitoring layer may be monitored, including remote monitoring, to detect the penetration of moisture onto the monitoring layer through one of the attached impermeable plastic sheets. Any such penetration of moisture into the monitoring layer would essentially change the electrical conductivity of the conductive substance in the monitoring layer, thereby providing a means for monitoring the integrity of the sheets with respect to their impermeability.

One type of sheet which has been used in landfill sites included a three layer impermeable sheet having two outer plastic layers and an aluminum layer embedded therebetween. However, the overall structure of this three layer impermeable sheet was intended to actively prevent the seepage of various pollutants therethrough by providing the material with added puncture strength. Therefore, due to the high electrical conductivity of the aluminum, (resistivity=2.6548 microohm-cm, or conductivity=$37.667 \times 10^6$ S/m) which conductivity would be changed by leakage only to a minor degree, the aluminum sheet is not conveniently suited to be used to monitor the impermeability of the adjoining plastic sheets by sensing the conductivity.

In contrast thereto, the double layer impermeable plastic sheet of the present invention, whose outer layers are preferably made of impermeable plastic, or polymer, such as high density polyethylene, or PEHD, can be excellently suited for a simple connection with the monitoring layer. The monitoring layer can preferably be embedded between the two outer PEHD layers, and the monitoring layer can also preferably be made from PEHD, however, preferably of the electrically conductive type of PEHD. Typical conductive polymers can have low conductivities, or conductivities on the order of about 1 to about $10^{-16}$ S/cm at 25° C.

Many waste deposit sites have been built with tubings and molded parts for tubing systems manufactured from an electrically conductive plastic, or polyethylene, which can simply be referred to as PE-el. The same applies to plate material, for example for pit linings, where an electrically conductive outer surface is required for safety reasons to prevent a static charging and thus avoid an explosive risk.

The inventive arrangement of the present invention, that is, a plastic, or polymer, of the electrically conductive type sandwiched between two outer layers, may be used in a number of different types of construction. For example, the conductive layer may be placed between two smooth impermeable sheets as well as between two impermeable sheets having structure outside, or exterior surfaces. It is also possible to employ the plastic conductive layer of PEHD, in an electrically conductive manner, in so-called protecting plates of concrete for the protection of concrete layers. Such concrete protection plates can also utilize the two outer layers of PEHD. A further use of the arrangement of the present invention consists in the possibility of using the double layer impermeable plastic sheet with the embedded monitoring layer of electrically conductive PEHD therein as components of a double wall for container and pit constructions.

A device for monitoring conductivity of the sheet, which device could include a resistivity meter that measures resistivity changes, can be connected to the monitoring layer of electrically conductive PEHD to measure resistivity changes of the electrically conductive PEHD-layer. Thus, when the conductive PEHD layer comes into contact with seepage water passing through one of the plastic layers, a resistivity change can be detected and read on the meter.

An alternative means of monitoring can include a device for monitoring a current which is driven through the monitoring layer by means of a voltage unit. Such a current would also be dependent on the electric conductivity and thus also on the seepage water getting into, or coming in contact with, the electrically conductive PEHD-layer.

In summary, one aspect of the invention resides broadly in a waste disposal landfill for containing fluid runoff from wastes deposited in the landfill. The waste disposal landfill comprises at least one moisture impermeable sheet for being disposed under the landfill. The at least one moisture impermeable sheet comprises:

at least a first and a second layer of a moisture impermeable material, a moisture-sensitive conductive material disposed between the at least a first and a second layer, and apparatus for monitoring conductivity of the conductive material.

Another aspect of the invention resides broadly in an arrangement of impermeable sheets of plastic material which are suited to be monitored with respect to impermeability, in particular in waste deposits, characterized in that a monitoring layer of electrically conductive high density polyethylene is embedded within a double layer impermeable plastic sheet.

BRIEF DESCRIPTION OF THE DRAWINGS

Working examples of the invention and details thereof are illustrated in the following drawings, in which:

FIG. 1a shows a cut away view of a waste disposal site using impermeable sheets to control water penetration into the earth;

DESCRIPTION OF THE PREFERRED EMBODIMENTS

FIG. 1a shows one example of the construction of a waste disposal landfill in which several impermeable sheets are first placed at varying depths in the ground below the site where the waste will be deposited. Such impermeable sheets are generally disposed below the ground below the entire landfill site so that any pollutants which might get into the water from the waste can not move into the neighboring ground around the landfill. Such landfill sites also typically will have drainage means to collect any runoff that does gather in the impermeable sheets. The water collected in the drainage area can, if found to contain pollutants, be treated by treatment facilities (not shown) before letting the water into the environment.

However, over time, the integrity of the impermeable sheets, with regard to not permitting passage of water therethrough, may decrease and eventually seepage through the sheet may increase to a point where the site would have to be reconstructed. In typical installations, the drainage water would normally be checked to see if any pollutants passed through any of the layers. In general, presence of a pollutant in a lower layer would indicate that a sheet is no longer impermeable, that is, a hole may have developed in the sheet.

The present invention, as shown in the remaining figures, provides a means for monitoring the impermeability of the sheets.

Figure 1:
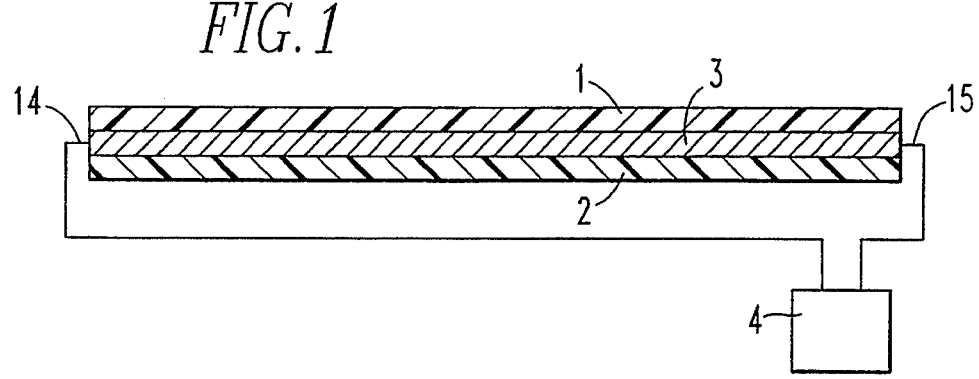
FIG. 1 shows, in section, an arrangement for a plastic sheet in which the monitoring layer is embedded within a double layer, smooth-surfaced impermeable plastic sheet.

In FIG. 1, the numerals 1 and 2 represent two smooth layers of a double layer impermeable plastic sheet preferably made from high density polyethylene (PEHD). A monitoring layer 3 of PEHD of the electrically conductive type is preferably embedded between these two outer layers 1 and 2, and all three layers can be firmly adhered to each other.

FIG. 1 also shows one manner in which the electric conductivity of the monitoring layer can be monitored. Electrical contacts 14 and 15 can be made at at least two different sites in the monitoring layer, and depending on the size of the sheet, several sets of contacts may be desirable. An electric resistivity meter 4 can then be connected between any pair of contacts in the layer to measure the conductivity of the layer between the two contacts of the pair. As discussed previously, the electric conductivity of the monitoring layer will typically vary when the latter comes into contact with seepage water or other moisture passing through either of layers 1,2 when the double impermeable material is built into the site of use.

Such a conductive polyethylene sheet 3 can be at least partially porous, and thereby, when moisture penetrates one of the outer layers 1 or 2, from either side of the barrier, the moisture could possibly wick through the conductive layer over a substantial portion of the distance between 14 and 15, thereby, when the conductivity is measured, an increase in conductivity, due to the moisture, would be detected.

It is generally known that conductive polymers, such as polyethylene have a molecular character that makes electron motion along individual macromolecules one-directional. Specifically, high density polyethylene is generally characterized by single, unbranched chains of ethylene units forming a long strand, and can be represented by:

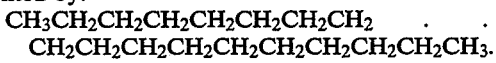
$CH_3CH_2CH_2CH_2CH_2CH_2CH_2CH_2$ . . .
$CH_2CH_2CH_2CH_2CH_2CH_2CH_2CH_2CH_2CH_3$.

Thus, an arrangement of such strands, side by side, presents a one-dimensional direction of electron movement along the length of the strands. The reduced dimensionality of such polymers implies that their electronic properties can be governed by the occurrences of certain types of ground states. Thus, when a charge is injected into such a system, the charge can induce a change in the electronic charge density and atomic positions both on the molecular site of the injection, as well as on neighboring sites. A presence of moisture which could essentially wick between individual strands of the polymers can therefore facilitate electron transfer between strands and thus alter the overall conductivity across a sheet of such materials.

Figure 2:
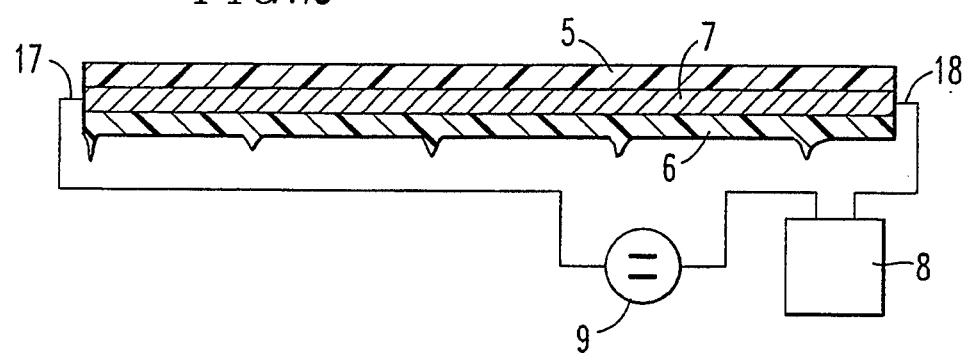
FIG. 2 shows, in section, an arrangement in which the monitoring layer is embedded within a double layer, structured-surface impermeable sheet.

The arrangement of FIG. 2 is similar to that of the arrangement of FIG. 1 except in this second embodiment the impermeable sheets 5 and 6 are shown having a structured surface on the outside surfaces, instead of a smooth surface. Like the previous embodiment, there is a monitoring layer 7, preferably of an electrically conductive PEHD, between the two outer impermeable sheets 5 and 6, which two outer sheets 5 and 6 are also preferably constructed from PEHD.

FIG. 2 also depicts a second manner in which the impermeability can be monitored. In this embodiment, to monitor the electric conductivity between two contacts 17 and 18 in the monitoring layer, an electric monitoring device 8 as well as a voltage unit 9 for driving an electric current through the monitoring layer are provided. The amount of current, which would be dependent on any moisture leakage through layers 5 and 6, can be monitored by an electric monitoring device 8 which can preferably operate a remote reading device (not shown).

Figure 3:
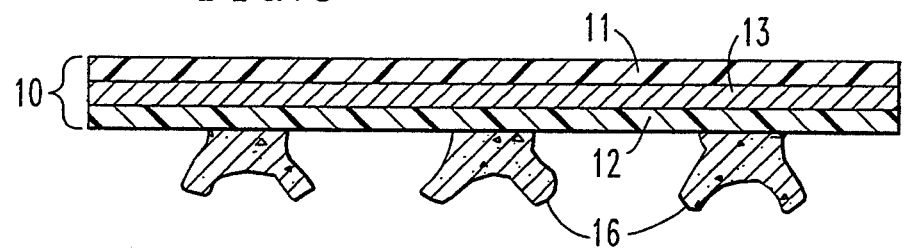
FIG. 3 shows, in section, a monitoring layer which is embedded within a concrete protecting plate made from PEHD.

The third embodiment according to FIG. 3 shows a concrete protecting plate 10 protecting concrete devices 16. This protecting plate 10 preferably has outer layers 11 and 12 which consist of PEHD. Between these outer layers a monitoring layer 13, also preferably of PEHD but of the electrically conductive type can be embedded. Once again the conductivity, dependent upon eventual leakage in the outer layers 11 and 12 may be monitored as illustrated in FIGS. 1 and 2.

In summary, one feature of the invention resides broadly in an arrangement of impermeable sheets of plastic material which sheets are suited to be monitored with respect to impermeability, in particular in waste deposits, characterized in that a monitoring layer 3 of electrically conductive PEHD is embedded within a double layer impermeable plastic sheet 1,2.

Another feature of the invention resides broadly in an arrangement of impermeable sheets of plastic material, characterized in that the two outer impermeable sheets 1,2 of the double layer impermeable plastic sheet consist of PEHD.

Yet another feature of the invention resides broadly in an arrangement of impermeable sheets of plastic material, characterized in that the impermeable sheets 1,2 of the double layer impermeable plastic sheet are smooth.

A yet another feature of the invention resides broadly in an arrangement of impermeable sheets of plastic material, characterized in that the impermeable sheets 5,6 of the double layer impermeable plastic sheet are structured.

A yet further feature of the invention resides broadly in an arrangement of impedeable sheets of plastic material, characterized in that the double layer impermeable plastic sheet 11,12 with the embedded monitoring layer 13 of electrically conductive PEHD therein forms components of a concrete protecting plate 10.

A further feature of the invention resides broadly in an arrangement of impermeable sheets of plastic material, characterized in that the double layer impermeable plastic sheet with the embedded monitoring layer of electrically conductive PEHD therein forms components of a double wall for container and pit constructions.

A still further feature of the invention resides broadly in an arrangement of impermeable sheets of plastic material, characterized in that an electric resistivity meter 4 is connected to the monitoring layer 3 of electrically conductive PEHD.

A yet further feature of the invention resides broadly in an arrangement of impermeable sheets of plastic material, characterized in that a voltage unit 9 and a monitoring device 8 to measure the current, which is driven through the monitoring layer by the voltage unit, are connected to the monitoring layer 7. A monitoring layer 3 of electrically conductive PEHD is embedded within an arrangement of impermeable sheets from plastic material 1,2 which are suited to be monitored with respect to impermeability, to enable easy monitoring of the presence of seepage water in deeper layers. Monitoring is effected by registering the electrical conductivity of the conductive monitoring layer made of PEHD.

Some examples of landfills and devices for controlling ground water runoff are disclosed in the following United States patents: U.S. Pat. No. 5,054,961 to Lynn Sherman, entitled "Onsite Soil Treatment Process"; U.S. Pat. No. 5,022,786 to Kenneth Philo, entitled "Method and Apparatus for the Recovery and Treatment of Ground Water Contaminated by Hazardous Waste"; U.S. Pat. No. 4,927,279 to Willie Simpson, entitled "Leak Prevention Structure, Method and Apparatus", U.S. Pat. No. 4,810,131 to Dennis Turner, entitled "Landfill Leachate Collection and Leak Detection Sump System"; and U.S. Pat. No. 4,790,688 to Trevor Castor, entitled "Landfill Leachate Control Process and Product".

Some examples of electrically conductive plastics, electrically conductive polyethylenes, and high density polyethylenes which could possibly be used for the present invention are disclosed in the following United States patents: U.S. Pat. No. 4,803,597 to Watanabe et al., entitled "Electric Double Layer Capacitor"; U.S. Pat. Nos. 4,800,126 and 4,719,039 to Nicholas Leonardi, both entitled "Electrically Conductive Polyethylene Foam"; U.S. Pat. No. 5,098,610 to Okamura et al., entitled "Conductive Thermoplastic Resin Composition" and U.S. Pat. No. 4,451,536 to Barlow and Meeks, entitled "Heat Distortion Resistant Thermoplastic Semi-Conductive Composition".

Other types of conductive polymers which could possibly be used for the present invention can be found on pages 935 and 936 of the "Concise Encyclopedia of Chemical Technology", Kirk-Othmer, 1985.

Some types of devices which can be used to measure conductivity are disclosed in the following U.S. patents: U.S. Pat. No. 4,679,332 to Luthi, entitled "Sensor Device for a Machine for Measuring Conductive Parts Mounted on a Measurement Table"; U.S. Pat. No. 4,390,842 to Wygant and Jones, entitled "Fluid Conductivity Device for Measuring Fluid Volumes and Method Therefor"; U.S. Pat. No. 4,160,946 to Frigato, entitled "Device for Measuring Conductivity of a Solution"; U.S. Pat. No. 5,068,619 to Nakano and Matsushita, entitled "Conductivity Measuring Device"; and U.S. Pat. No. 4,926,116 to Talisa, entitled "Wide Band Large Dynamic Range Current Sensor and Method of Current Detection Using Same".

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A waste disposal landfill-for containing fluid runoff from wastes deposited in the landfill, said waste disposal landfill comprising:

at least one moisture impermeable sheet for being disposed under the landfill, the at least one moisture impermeable sheet comprising:

at least a first and a second layer of a moisture impermeable material;

a sheet of electrically conductive plastic disposed between said at least a first and a second layer;

said sheet of electrically conductive plastic having a longitudinal dimension with at least two areas spaced apart from one another along the longitudinal dimension;

said sheet of electrically conductive plastic having a first conductivity between said two spaced apart areas;

said sheet of electrically conductive plastic having a second conductivity between said two spaced apart areas in the presence of an amount of moisture between said two spaced apart areas;

said second conductivity being greater than said first conductivity; and means for monitoring the conductivity of said electrically conductive sheet, said means for monitoring being electrically connected directly to said two spaced apart areas of said electrically conducting sheet.

2. The waste disposal landfill according to claim 1, further including a monitoring station disposed a distance remote from said waste disposal landfill, and said remote monitoring station comprises said means for monitoring conductivity.

3. The waste disposal landfill according to claim 1 wherein said first and second layers comprise plastic sheets.

4. The waste disposal landfill according to claim 3, wherein said conductive plastic sheet comprises an electrically conductive polymer.

5. The waste disposal landfill according to claim 4, wherein:

said first and second layers comprise polyethylene; and said conductive material comprises electrically conductive polyethylene.

6. The waste disposal landfill according to claim 5, wherein:

said first and second layers comprise high density polyethylene; and said conductive material comprises conductive high density polyethylene.

7. The waste disposal landfill according to claim 6, wherein said means for monitoring comprises:

an electric resistivity meter;

at least first and second electrical leads; and each said at least first and second electrical leads extending from said electrical resistivity meter into direct contact with corresponding ones of said at least two spaced apart areas of said electrically conductive plastic sheet to electrically connect said monitoring means directly to said at least two spaced apart areas.

8. The waste disposal landfill according to claim 6, wherein said means for monitoring comprises:

means for driving current through said conductive material;

a current measuring device;

at least a first electrical lead directly connecting said means for driving current to said current measuring device;

at least a second electrical lead directly connecting said current measuring device to one of said two spaced apart areas; and at least a third electrical lead directly connecting another of said two spaced apart areas to said means for driving current.

9. Arrangement of impermeable sheets of plastic material which are suited to be monitored with respect to impermeability of moisture, in particular in waste deposits, said arrangement comprising:

a double layer impermeable plastic sheet having an impermeability to moisture, and said double layer sheet comprising a first moisture impermeable plastic sheet and a second moisture impermeable plastic sheet;

a layer of electrically conductive high density polyethylene embedded within the double layer impermeable plastic sheet between said first plastic sheet and said second plastic sheet;

said layer of electrically conductive high density polyethylene having:

a first electrical conductivity, and a second electrical conductivity in the presence of moisture leaking through one of said first and second plastic sheets;

said second conductivity being greater than said first conductivity; and said layer being configured to be monitorable with respect to the conductivity thereof.

10. Arrangement according to claim 9, wherein said first and second impermeable sheets of the double layer impermeable plastic sheet comprise high density polyethylene.

11. Arrangement according to claim 10, wherein said first and second impermeable sheets of the double layer impermeable plastic sheet are smooth.

12. Arrangement according to claim 11, wherein said first and second impermeable sheets of the double layer impermeable plastic sheet are structured.

13. Arrangement according to claim 12, wherein said double layer impermeable plastic sheet with the embedded layer of electrically conductive high density polyethylene therein forms components of a concrete protecting plate.

14. Arrangement according to claims 12, wherein said double layer impermeable plastic sheet with the embedded layer of electrically conductive high density polyethylene therein forms components of a double wall for container and pit constructions.

15. Arrangement according to claim 14, further comprising an electric resistivity meter connected to the layer of electrically conductive high density polyethylene.

16. Arrangement according to claim 14, further comprising:

a voltage unit for driving current through the layer of electrically conductive high density polyethylene;

a monitoring device to measure the current driven through the layer of electrically conductive high density polyethylene by the voltage unit; and said voltage unit and said monitoring device are connected directly to the monitoring layer.

17. Arrangement according to claim 9, wherein the monitoring layer of electrically conductive high density polyethylene has a longitudinal dimension with first and second areas spaced apart from one another along the longitudinal dimension thereof, and said arrangement further comprises:

an electric resistivity meter connected to the monitoring layer of electrically conductive high density polyethylene;

first electrical lead means electrically connecting said electric resistivity meter directly to one of said first and second spaced apart areas; and second electrical lead means electrically connecting said electric resistivity meter directly to the other of said first and second spaced apart areas.

18. Arrangement according to claim 9, wherein the monitoring layer of electrically conductive high density polyethylene has a longitudinal dimension with first and second areas spaced apart from one another along the longitudinal dimension thereof, and said arrangement further comprises:

a voltage unit for driving current through the layer of electrically conductive high density polyethylene;

a monitoring device to measure the current driven through the monitoring layer by the voltage unit;

first electrical lead means directly connecting said voltage unit for driving current to said monitoring device;

second electrical lead means directly connecting said monitoring device to one of said first and second spaced apart areas; and third electrical lead means directly connecting the other of said first and second spaced apart areas to said voltage unit for driving current.

19. The waste disposal landfill according to claim 1, wherein said means for monitoring comprises:

an electric resistivity meter;

first and second electrical leads;

said first electrical lead extending from said electrical resistivity meter into direct contact with one of said at least two spaced apart areas of said electrically conductive plastic sheet; and said second electrical lead extending from said electrical resistivity meter into direct contact with another of said at least two spaced apart areas of said electrically conductive plastic sheet.

20. The waste disposal landfill according to claim 1, wherein said means for monitoring comprises:

means for driving current through said conductive material;

a current measuring device;

a first electrical lead directly connecting said means for driving current to said current measuring device;

a second electrical lead directly connecting said current measuring device to one of said two spaced apart areas; and a third electrical lead directly connecting another of said two spaced apart areas to said means for driving current.

* * * * *